United States Patent
Stieler

[19]

[11] Patent Number: 6,044,322
[45] Date of Patent: Mar. 28, 2000

[54] METHOD AND ARRANGEMENT FOR TRAFFIC MONITORING

[75] Inventor: Bernhard Stieler, Braunschweig, Germany

[73] Assignee: Deutsche Forschungsantalt fur Luftund Raumfahrt e.V., Bonn, Germany

[21] Appl. No.: 08/852,895

[22] Filed: May 8, 1997

[30] Foreign Application Priority Data

May 10, 1996 [DE]  Germany .......................... 196 19 015

[51] Int. Cl.⁷ .............................. G08G 5/06; G01S 13/06
[52] U.S. Cl. ........................... 701/120; 342/417; 342/36; 704/270
[58] Field of Search .............................. 701/120; 342/36, 342/417, 429, 432; 704/231, 251, 270

[56] References Cited

U.S. PATENT DOCUMENTS

| | | | |
|---|---|---|---|
| 4,213,126 | 7/1980 | Mulder et al. ........................ | 343/5 SM |
| 4,806,936 | 2/1989 | Williams et al. ....................... | 342/126 |
| 5,374,932 | 12/1994 | Wyschogrod et al. .................... | 342/36 |
| 5,400,031 | 3/1995 | Fitts ........................................... | 342/36 |
| 5,714,948 | 2/1998 | Farmakis et al. ....................... | 340/961 |

FOREIGN PATENT DOCUMENTS 0 613 111 A1  8/1994  European Pat. Off. .
6-342061  12/1994  Japan .

OTHER PUBLICATIONS

Patent Abstracts of Japan; Pub. No. 06342061; Dec. 13, 1994.

*Primary Examiner*—Michael J. Zanelli
*Attorney, Agent, or Firm*—Salter & Michaelson

[57] ABSTRACT

A method for traffic monitoring, particularly at airports, is disclosed including the localization of a traffic object is carried out by direction finding and by additional information. The radio communication between the traffic object and a control center is recorded and fed to a speech recognition unit on the side of the control center; an identification phrase transmitted together with the message of the traffic object is identified in the speech recognition unit on the side of the control center and allocated to the localized traffic object; and that the allocated identification of the localized traffic object is continuously maintained, the source of the identification being on the side of the traffic object.

6 Claims, 2 Drawing Sheets

METHOD AND ARRANGEMENT FOR TRAFFIC MONITORING

BACKGROUND OF THE INVENTION

Subject of the invention is a method and an arrangement for traffic monitoring, particularly at airports.

The continuous increase of air traffic and the development of more and more complex situations at airports and their surrounding areas based on the increase of traffic lead to the necessity of implementing an efficient handling of traffic in the airport vicinity as well as on the runways and taxiways in a highly automatic way and in particular through weather-independent situation determination.

There are different types of traffic objects at airports: aircraft taking off and landing or moving on runways and taxiways and also aircraft stationary at certain points of time; furthermore there are also vehicles of various types for the conveyance of passengers or also for carrying through maintenance or transportation tasks.

The big variety of the traffic objects makes, of course, reliable localization and identification still more difficult, since many of them do not carry positioning equipment and since for reasons of costs and also complication all traffic objects are not equipped as would be required.

For the situation determination different sensor systems are known (EP 0 613 111 A1). Among them are, for instance, non-cooperative sensors such as induction loops in the runway and taxiway, photoelectric barriers or also primary radar as in the so-called Airport Surface Detection Equipment (ASDE). Such sensors can also work without a particular positioning equipment within the traffic object. ASDE can even recognize obstacles on the runway or taxiway. Certain traffic objects are also equipped with cooperative sensors, for example based secondary radar or by the readout via Automatic Dependent Surveillance (ADS) of the positioning obtained within the aircraft through satellite navigation. These sensors simultaneously allow the identification of the traffic object, yet they require the availability of installations which are still under development.

EP 0 613 111 A1 suggests an airport surveillance system and a method for the implementation of the airport surveillance by means of a system providing sensors along the runway. Those sensors register the position and speed of the moving vehicles or aircraft on the runways and taxiways. Furthermore it provides for a speech recognition unit by which the vocabulary used by the controller on the ground is recognized. As it is generally known, the controller on the ground or in the tower repeats after the pilot's first radio contact the pilot's words as regards aircraft identification, flight number and airline. The speech recognition unit analyses the words repeated by the controller in the tower. Aided by data fusion software the data of the sensors defining the position of the aircraft and the other traffic objects of the airport and the data of the speech recognition unit are put together. For the purpose of the application according to EP 0 613 111 A1 the speech recognition unit can be confined to the relatively simple embodiment, in which the in advance programmed speech of a known person, i.e. the flight controller's speech on the ground, has to be recognized.

SUMMARY OF THE INVENTION

The object of the invention is to propose a method and an arrangement for traffic monitoring of more universal application that can get by with already existing installations, needing as little technical upgrading as possible at the airports, requiring no upgrading for the traffic objects themselves, yet enabling the localization and identification of the traffic objects.

The object is solved by a method for traffic monitoring, particularly at airports, wherein a localization of a traffic object is carried out by direction finding and by means of additional information; the radio communication between the traffic object and a control center is recorded and fed to a speech recognition unit on the side of the control center; an identification phrase transmitted together with the message of said traffic object is identified in said speech recognition unit on the side of said control center and allocated to said localized traffic object; and said allocated identification of said localized traffic object is continuously maintained, the source of identification being on the side of said traffic object.

With the arrangement the object is solved by that one or more installations are provided for the localization of traffic objects; that a communication installation is provided for communication between said traffic objects and a control center; that a speech recognition unit is provided on the side of said control center for speech recognition of radio messages of said traffic objects and optionally of said control center; that a data processing unit is provided; that a connection is provided between said data processing unit and said installation or installations for localization and said speech recognition unit; and that said data processing unit has means for a fusion of its input data for the allocation of unequivocal location and identification of said traffic objects and for transmission of the allocation results to an output unit.

With such a method and an arrangement it is practically not required any additional installations or equipment on the side of the traffic object. As a general rule the system can get by with the generally existing installations for localization, for instance, and requires in addition only the communication system already existing within the traffic objects, i.e. radio equipment for speech connection with the control center or ground station. Such radio equipment is, of course, installed in aircraft, and also the other vehicles at the airport always have to carry radio equipment, expecially for receiving instructions (for example for directing buses, fire engins, transportation and maintenance vehicles).

In addition to those already available elements a speech recognition unit is now required in the control center, as, for instance, in the airport tower, as well as a computer or a data processing unit for data fusion.

The method according to the invention starts as it is general practice on airports, with the localization of the traffic object based on the direction finding in the traditional way together with supplementary information such as the measurement of primary radar or of a known runway or taxiway. But it can also be obtained through the measurements of several direction finding antennas. These position data are fed to a data processing unit.

For finding the direction of the traffic object the control center must have a radio connection with the object which at present and as a general standard begins with an identification phrase, for example with the aircraft registration number or some other spoken phrases identifying the traffic object. Speech recognition units are able to read out from such a communication the said identification phrase or at least to recognize phrases for its identification. The origin of identification is the traffic object itself because the identification phrase precedes the transmitted message, thus becoming the source of identification. From its contents the speech recognition reads out the data relevant for identification. The direction from which the message arrives, is computed in the control center and used for the position definition of the traffic object.

The identification phrase of said traffic object identified in the speech recognition unit is fused in the data processing unit together with the positioning data.

This process allows an unequivocal assignment of the identification to the date of localization of the traffic object and is carried out only once, when it is clarified which identified traffic object can be assigned to a definite direction finding process.

When the traffic object is moving at the airport, its identification phrase is attached to it. It is known to the computer that traffic objects are not able to move discontinuously and that they normally do not leave preassigned routes.

The data fusion results can thus be provided to an output unit, such as a display in the tower or a registration unit. In case the unequivocal identification during the target tracking runs into problems, for example if two traffic objects cross on their ways very closely, it is preferred to have this situation recognized by the method. Within the computer a label is generated for identifying the existing danger. Thus the controller or the computer itself are brought into action. The traffic object or objects are requested to transmit their identification phrase again through the radio communication link. Such a request can be initiated either by the personnel in the control center or by the computer through synthetic speech or some radio signal. The identification originates then again within the traffic object.

The invention offers the possibility to put up a cooperative sensor system at airports, in the vicinity of airports or in connection with other applications. For this purpose the direction finder and other non-cooperative localization systems at airports, such as the above mentioned ASDE, are combined at the control center with the radio transceiver for radio contact from and to the aircraft. The invention makes use of computers for combining direction finding, localization and speech recognition for identifying the traffic object and for unequivocal object tracking.

The invention also allows to carry out traffic monitoring other than for airports such as in harbors or big industrial areas, if basic conditions are similar.

BRIEF DESCRIPTION OF THE DRAWINGS

Preferred embodiments of the present invention will now be described by way of example with reference to the accompanying drawings.

DETAILED DESCRIPTION OF THE PREFERRED EMBODIMENTS

Figure 1:
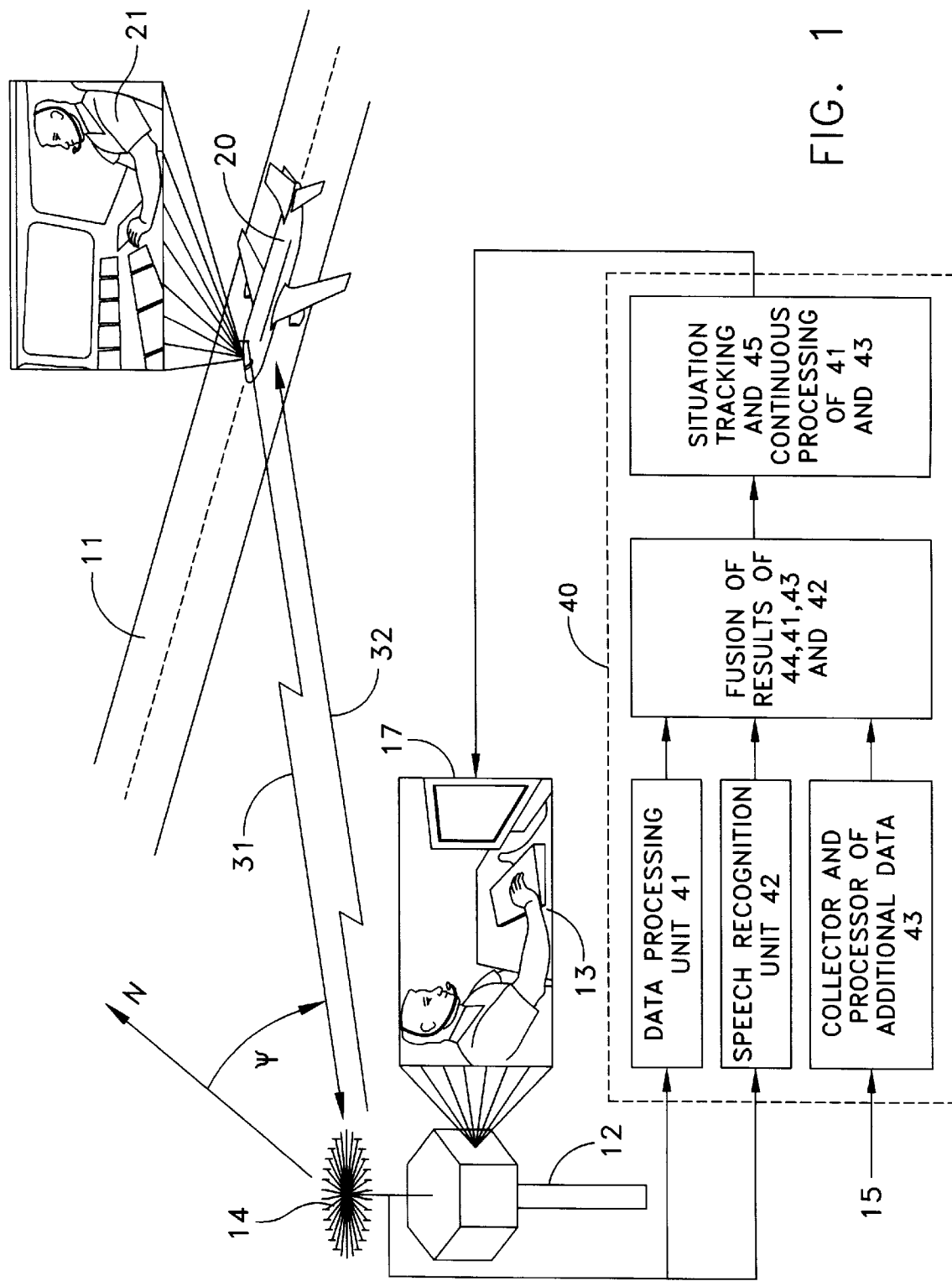
FIG. 1 shows the schematic sequence of the invented procedure.

FIG. 1 presents a schematic overview of the situation as a whole. Runway 11, the control center shown as tower 12 housing the controller 13, the direction finding antenna 14, the localization 15 from a primary radar schematically indicate the setup of an airport.

On runway 11 a traffic object 20, an aircraft, with pilot 21 is shown. The pilot 21 of the traffic object 20 transmits a message to the tower 12 or to the controller 13, respectively. This message is indicated as radio transmission 31 in this figure. The radio transmission 31 is in general opened with the identification phrase of the traffic object 20. If for example the identification phrase is D-ADAM and the tower is at Braunschweig airport, the message 31 will begin with: "Braunschweig tower this is Delta-Alpha-Delta-Alpha-Mike". The controller 13 in tower 12 in general repeats in his radio transmission 32 the identification phrase or an unequivocal abbrevation of it in order to indicate to the traffic object that it is addressed.

The direction finding antenna 14 measures the direction to the traffic object 20 each time it transmits a radio signal; this is indicated here through the angle "psi" with respect to north. The direction finding is based upon the incoming radio signal from the traffic object, i.e. the incoming communication transmission which is the source for identification. In connection with the localization 15 of the primary radar or other information on the localization or the runway used the object to be identified can be recognized among a plurality of traffic objects.

All data are now fed to the data processing unit 40 indicated schematically in the lower half of the figure. A block diagram schematically indicates the data processing within the unit 40:

On the one hand in tower 12 or directly from direction finding antenna 14 data for the direction finding with respect to the traffic object 20 in field 41 are processed in a speech processing unit 42, on the other hand an analysis of the recorded communication between pilot and controller is carried out in the speech recognition unit 42 and finally additional data 15 on the aircraft position from a primary radar or from other sources are collected and processed in field 43. The speech recognition unit is laid out in a way that the information of the traffic object's spoken phrases is evaluated. Unlike the mentioned state of the art a direct evaluation of the information coming from the traffic object takes place without the detour via repetition of the information in a form appropriate for the speech recognition unit. An error due to the controller's misunderstanding cannot take place here. A verification of the correctness of the information received at the speech recognition unit can take place through comparison of phrases heard by the controller and displayed to him or through comparison of the identification phrase stored in the computer for an expected traffic object and the result of the speech recognition. A discrepancy is displayed to the controller in the latter case. The correction is carried out automatically if it is of minor importance or by the controller through correct input of the identification phrase and its processing in the speech recognition unit or finally through his request to the traffic object to repeat the identification phrase.

Fields 41 and 43 then transmit data on the measured angle psi and the coordinates x,y,z of the traffic object on to the field 44 of the block diagram in which a fusion takes place with the results of the speech recognition unit 42, here for instance the realisation that the traffic object 20 is "D-ADAM". From position and direction of movement on the one hand and the identification on the other the data fusion in field 44 generates a unit and thus assures that both types of information become attached to one object within the computer. This date is passed on to field 45. Field 45 provides a situation tracking, i.e. the updated data from fields 41 and 43 are continuously processed: the speech recognition unit 42 can, but need not necessarily be called upon for further updating. If it is called upon it uses the speech information coming from the traffic object. As output result of the situation tracking 45 a corresponding output is forwarded to an output unit, for example to the man machine interface 17 of the controller 13.

This assignment is particularly favourable, since the direction finding antenna 14 is an antenna reacting upon the input direction of the radio transmission 31 thus allowing the synchronous identification in a very simple way.

Direction finding units with stationary antenna are already installed at most airports. The speech communication 31/32 between pilot 21 and controller 13 is switched over between aircraft (traffic object 20) and tower 12. After or before the radio contact to the tower ("Braunschweig tower") the pilot transmits his aircraft identification phrase or another identification phrase, in case of a traffic object other than an aircraft. The controller 13 repeats the identification phrase or the identifying phrases in his answer. The mainly standardized identification code offers an excellent base for the automatic recognition of the identification phrase through the digitized speech signals aided by programs for word identification. Such programs are able to extract the desired information from the spoken words of the pilot in spite of disturbances during the radio contact. In case of any doubt a further evaluation of the information repeated and/or transmitted by the controller can take place. Of particular advantage is the completion of the direction finder 14 by a digitizing process for the measured direction with simultaneous computer controlled analysis of the phrases spoken by the pilot 21 for the recognition of the identification phrase of traffic object 20.

As already mentioned above, besides those two types of information—direction and identification phrase—additional information such as measurement signals of other parts of sensors or the knowledge of predefined courses of movements as on the runway or taxiway are processed in the computer or data processing unit 40 for data fusion 44. This serves for localization, yet as a general rule not for identification of the traffic object.

Data fusion permits a processing of the incoming information for unequivocal localization and identification of each traffic object.

It is useful to provide also data on the airport topography, on flight plans and taxiway plans of the traffic object and other information besides the mentioned sensor data. For reasons of simplification this is omitted in FIG. 1.

Figure 2:
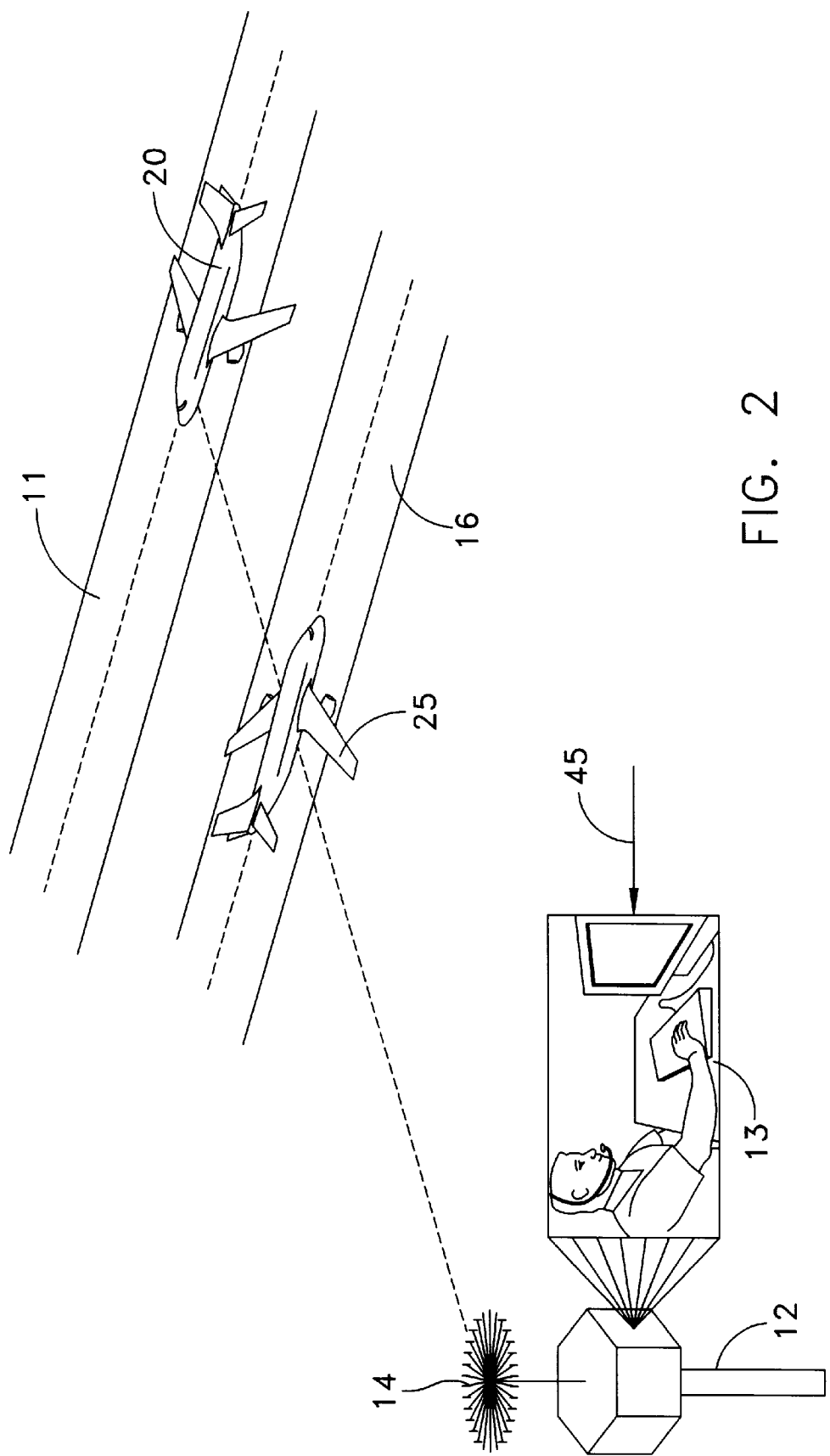
FIG. 2 shows a special critical situation.

FIG. 2 indicates a situation where an unequivocal identification might not occur. Two traffic objects 20, 25 are in the same direction as seen from the direction finding antenna 14, and during situation tracking 45 doubts on the identity of the traffic objects 20 and 25 may come up. However, the data processing unit 40 recognizes the situation. It puts up a label for danger identification and transmits it for instance via the man machine interface 17 to the controller 13 who can request the traffic objects 20 and 25 to transmit their identification phrase anew. This request can preferably also be initiated by the computer via synthetical speech or via radio technique in some other form.

The knowledge of the differences between the runways 11 and 16 can already be sufficient for the data processing unit 40 to allocate unequivocally the information received.

It will be understood that the above description of the present invention is susceptible to various modifications, changes and adaptations.

What is claimed is:

1. Method for traffic monitoring of a traffic object comprising the steps of:

localizing the traffic object by direction finding utilizing a single direction finding antenna and by means of additional information;

recording a radio communication between said traffic object and a control center and feeding the communication to a speech recognition unit on the side of said control center;

identifying an identification phrase which is transmitted together with the communication of said traffic object by said speech recognition unit on the side of said control center and which is allocated to said localized traffic object; and continuously maintaining said allocated identification of said localized traffic object, the source of said identification being on the side of said traffic object.

2. Method according to claim 1, wherein an unequivocal allocation between a position of the traffic object and said identification is carried out and, in case of a recognized discrepancy within said allocation on the side of said control center any one of a manual correction, an oral request and an automatic request is transmitted to said traffic object for a repetition of any one of an oral and automatic transmission of said identification phrase.

3. A system for traffic monitoring traffic objects, comprising:

a single direction finding installation for measuring the direction to the traffic objects upon the traffic objects transmitting a radio message;

a primary installation for processing additional data relating to the localization of the traffic objects;

a communication installation for communication between said traffic objects and a control center;

a speech recognition unit on the side of said control center for speech recognition of radio messages of said traffic objects and optionally of said control center;

a data processing unit;

a connection between said data processing unit and said direction finding installation and primary installation for localization and said speech recognition unit; and wherein said data processing unit has means for fusion of input data for the allocation of unequivocal location and identification of said traffic objects and for transmission of the allocation results to an output unit.

4. The system according to claim 3, wherein, said single direction finding installation for the localization of traffic objects comprises a single direction finding unit or direction finding antenna for measuring the direction of the communication transmission.

5. The system according to claim 4, wherein, said primary installation comprises a primary radar which is provided together with said direction finding unit or said direction finding antenna for measuring the direction of said incoming radio transmissions from said traffic objects.

6. A system for traffic monitoring traffic objects, consisting of:

a single direction finding installation for measuring the direction to the traffic objects upon the traffic objects transmitting a radio message;

a primary installation for processing additional data relating to the localization of the traffic objects;

a communication installation constructed and arranged to provide communication between said traffic objects and a control center;

a speech recognition unit on the side of said control center constructed and arranged to provide speech recognition of radio messages of said traffic objects;

a data processing unit;

a connection between said data processing unit and said direction finding installation and primary installation for localization, and said speech recognition unit; and wherein said data processing unit includes means for fusion of input data for the allocation of unequivocal location and identification of said traffic objects and for transmission of the allocation results to an output unit.

* * * * *